United States Patent [19]
Terron et al.

[11] 3,915,925
[45] Oct. 28, 1975

[54] FAST COLD SETTING RESINOUS BINDERS FOR REFRACTORY MATERIALS

[75] Inventors: Christopher Terron, Lockerley near Romsey; Peter Herbert Richard Bryan Lemon, Newtown near Romsey, both of England

[73] Assignee: Borden, Inc., Columbus, Ohio

[22] Filed: May 16, 1974

[21] Appl. No.: 470,360

[52] U.S. Cl.................... 260/38; 164/43; 260/39 R; 260/42.37; 252/429; 252/436
[51] Int. Cl.² ........................................... C08L 61/10
[58] Field of Search......... 252/429, 436; 260/505 R, 260/DIG. 40, 38, 39 R, 42.37; 164/43

[56] References Cited
UNITED STATES PATENTS
1,279,296  9/1918  Dawns............................ 260/505 R
2,175,437  10/1939  Lazar et al...................... 260/505 R Primary Examiner—Melvyn I. Marquis
Assistant Examiner—S. M. Person
Attorney, Agent, or Firm—George A. Kap; George P. Maskas; Daniel D. Mast

[57] ABSTRACT

A catalyst is prepared by reacting a mixture of aromatic hydrocarbons having a boiling range of about 130° to 175°C with sulfuric acid at a temperature within the range of 40° to 160°C. The catalyst does not crystallize at −5°C. The catalyst is useful at low temperatures for the production of resin-bonded foundry molds and cores.

10 Claims, No Drawings

FAST COLD SETTING RESINOUS BINDERS FOR REFRACTORY MATERIALS

This invention relates to resin-bonded refractory granules and more particularly to a catalyst which will give rapid setting times with resins at room temperature and to a process for the production of foundry molds and cores.

Phenol formaldehyde resoles and phenol formaldehyde furfuryl alcohol resins are well known as binders for sand to make foundry cores and molds which harden at room temperature. In this process, toluene sulfonic acid is used as catalyst. Commerical sources of this contain a 65% aqueous solution of a mixture of ortho and para isomers and a small proportion (<2%) of free sulfuric acid. The catalyst is added to sand in a foundry mixer such as the Fordath type, mixed to disperse the catalyst, the resin is then added, mixed until dispersed, then immediately discharged into a mold. Alternatively, a continuous screw mixer such as that described in U.K. Pat. No. 987,488 may be used, the catalyst being added to the screw before the resin.

However, one of the disadvantages of using toluene sulfonic acid solutions as catalysts is the relatively slow rate of setting of the sand/resin/catalyst system. Fast setting times can be obtained using an inorganic acid, such as sulfuric acid, but strengths of the resultant cores are relatively low and the surface weak. Products such as those described in U.K. Pat. No. 1,248,756 go some way to improving this strength and still retain fast setting times.

In U.K. Pat. No. 1,253,290, there is described a catalyst which is substantially anhydrous toluene sulfonic acid which gives rapid setting with phenol formaldehyde and phenol formaldehyde furfuryl alcohol resins. Unfortunately, this catalyst is solid at room temperature which makes it difficult to add to and mix with sand and resin.

In U.K. Pat. No. 1,329,295, there is described a mixture of aromatic sulfonic acids. The mixture, however, does not have a $-5°C$ crystallization temperature.

We have now found that it is possible to make a substantially anhydrous fast setting catalyst which is liquid at room temperature and does not crystallize above $-5°C$ by sulfonating mixtures of aromatic hydrocarbons. Moreover, the resultant liquid catalyst gives very fast setting times and good core strengths with both phenol formaldehyde resoles and phenol formaldehyde furfuryl alcohol resins. This type of catalyst also gives very fast setting times with urea formaldehyde furfuryl alcohol and furfuryl alcohol/formaldehyde resins and thus its use is not restricted to phenol formaldehyde/furfuryl alcohol type resins.

Accordingly, the present invention provides a catalyst for the production of resin-bonded foundry molds and cores, which comprises a substantially anhydrous mixture of aromatic sulfonic acids which does not crystallize at $-5°C$ and which is prepared by reacting a mixture of aromatic hydrocarbons with sulfuric acid at a temperature within the range of 40° to 160°C. The catalyst may optionally contain from 1 to 5% by weight of catalyst of an alcohol such as methanol.

The use of the catalyst according to the invention is not restricted to the batch mixer of screw mixer. It may be used with apparatus such as that described in U.K. Pat. Nos. 1,200,507, 1,133,255 and 1,094,091, each of whose object is to mix and blow rapid setting systems.

A further advantage of the catalyst according to the invention is that, being organic in nature, it is more readily degraded by heat than inorganic acids such as sulfuric acid. It is common practice in the foundry industry for the sand from molds and cores to be recycled to the core mixer after suitable deaggregation to be used again. The residual acid in the sand affects the setting time of the resin and this can give problems such as setting in the resin trough of the Fascold Machine as described in U.K. Pat. No. 1,133,255. Such problems are reduced when using the catalyst of the present invention.

The present invention also provides a process for the production of foundry molds and cores which comprises coating granules of a refractory material either simultaneously or sequentially in a single batch or in two separate batches with from 0.07 to 5.0% by weight of a catalyst as described above and with 0.7% to 5.0% by weight of a synthetic resin binder, and, when the coating is conducted on separate batches, mixing the two batches for use. The synthetic resin is preferably phenol formaldehyde, phenol formaldehyde/furfuryl alcohol, urea formaldehyde/furfuryl alcohol or furfuryl alcohol/formaldehyde type as described herein.

The foundry molds and cores thus produced preferably set rapidly at ambient temperatures. However, the use of the catalyst of this invention is not restricted to fast setting applications and, by using low temperatures and reducing the proportion of catalyst, setting times of 1 to 10 hours may be obtained.

In winter, foundry conditions phenol formaldehyde and phenol formaldehyde/furfuryl alcohol resins set rather slowly so that production rates are reduced. By using the catalyst of the present invention, faster production rates, i.e. similar to those in the summer, may be obtained.

The refractory granules used can be silica sand, quartz, chromite, zircon or olivine sand or clays or asbestos. Silica sand is generally most commonly used.

Resins that can be used with this catalyst are phenol formaldehyde, phenol formaldehyde/furfuryl alcohol, urea formaldehyde/furfuryl alcohol, furfuryl alcohol/formaldehyde resin, polymerized furfuryl alcohol or mixtures of any of the above.

The catalysts of the present invention are made by reacting mixtures of aromatic hydrocarbons with sulfuric acid at from 40°–160°C preferably from 80°–120°C. Less than stoichiometric quantities of sulfuric acid are used and any unreacted hyrocarbon and water is removed by vaccum distillation at an absolute pressure of from 20 to 100 mm Hg and a temperature of 40°–160°C. Preferably the absolute presssure is from 30 to 70 mm and the temperature is from 40°–120°C. Alternatively, the reaction may be carried out with continuous azeotropic distillation of water and unreacted hydrocarbon and the unreacted hydrocarbon returned to the vessel. The following are examples of the aromatic hydrocarbons that can be used in this invention.

They are close cut highly refined, aromatic petroleum naphthas covering $C_8$–$C_{12}$ range having the following properties:

| PRODUCT | SG At 15.5/15.5°C S.G. = specific gravity | BOILING RANGE °C | AROMATIC CONTENT % v/v | FLASH PT. °C min.=minimum |
|---|---|---|---|---|
| Toluene (for comparison) | 0.869 | 96% distils within 0.6°C including 110.6°C | 99.5 | Below 22.8 |
| A | 0.868 | 137 – 175°C | 98 | 22.4 min. |
| B | 0.870 | 145 – 176°C | 98 | 32.2 min. |
| C | 0.842 | 138 – 165°C | 80 | 24.4 min. |

The above aromatic petroleum naphthas are commercially available from the various oil companies who market solvents. They can also be obtained by selected distillation of aromatic petroleum naphthas having a broader boiling range. The invention is illustrated in the following Examples. In the Examples as elsewhere all parts and percentages are by weight unless otherwise indicated. Parts are referred to in the following Examples as "pts".

EXAMPLE 1

Preparation of Aromatic Sulfonic Acid Catalyst

A. Selection of Hydrocarbon 1,000 gms. of hydrocarbon were reacted with 1,000 gms of 98% sulfuric acid for 3 hours at 90°–100°C. The catalyst was distilled at 60°C under vacuum. The yields (expressed as a percentage of total reactants) obtained were as follows:

| HYDROCARBON | YIELD | REMARKS |
|---|---|---|
| Toluene | 93% | Crystallizes out gradually at room temperature and readily at 0°C. |
| A | 95% | Clear thick catalyst stable at –5°C. 10% methanol added to Viscosity 150 c/s at 25°C (also stable –5°C) |
| B | 95% | Stable at –5°C. Viscosity 371 c/s at 25°C. |
| C | 92% | Viscosity 362 c/s at 25°C. Stable at –5°C. |

B. Variation of Ratio of Sulfuric Acid to Hydrocarbon A

The following ratios of hydrocarbon A to 98% sulfuric acid were examined:

| Hydrocarbon A/H$_2$SO$_4$ | YIELD | REMARKS |
|---|---|---|
| 1/1 | 95% | Thick stable fast catalyst. |
| 1/2 | 100% | Thin stable fast catalyst. |
| 1/3 | 97% | Thin stable fast catalyst. |

All could be used but the ratio of 1/1 is preferred. Sulfonation at higher temperatures (140°–160°C) resulted in some charring, -SO$_2$ released and discoloration of the resultant sulfonic acid although reaction times can be reduced. We prefer to use lower temperatures because of these effects.

EXAMPLE 2

Preparation of Phenol Formaldehyde Resin

A resin suitable for use with the catalyst of Example 1 is made by reacting 44.28 pts/wt. of 100% phenol with 42.04 pts/wt 44% formalin at a pH of 9.0 at 70°C for ½ hour cooling to 50°C adjusting the pH to 7.5, and vacuum distilling at this temperature to an S.G. of 1.22 at 20°C.

EXAMPLE 3

Preparation of Phenol Formaldehyde/Furfuryl Alcohol Resin 24.46 pts/wt. of phenol are reacted with 44.25 pts/wt. of 44% formalin at pH 9.0 for 2 hours at 60°C then at 80°C until the free formaldehyde (hydroxylamine hydrochloric method) falls below 4.5%. The pH is reduced to 7.0 and the resin distilled to remove 45.3 parts of water per 100 parts of formalin charged. Then 27.8 parts of furfuryl alcohol is added and mixed until homogeneous.

EXAMPLE 4

Preparation of Urea Formaldehyde/Furfuryl Alcohol Resin 4369 parts by weight of 44% formaldehyde solution were charged to resin kettle and pH adjusted with Caustic Soda Solution to 8.3–8.8 1410 parts by weight of urea were then added and the reactants heated to reflux with stirring. After refluxing for 20 minutes the mixture was cooled under vacuum to 55°–60°C and the pH adjusted to 7.5 with diluthydrochloric acid solution, 4210 parts by weight of water were removed by distillation under vacuum and 4210 parts by weight furfuryl alcohol added. The pH was then reduced to 5.0 with dilute hydrochloric acid solution and the mixture heated until a viscosity of 30 c/s was achieved. The pH was raised to 7.0 with caustic soda solution and 1780 parts by weight distillate removed under vacuum. 2090 parts of furfuryl alcohol were then added and the pH readjusted to 6.0 with hydrochloric acid solution. Finally 36 parts by weight of gamma-amino propyl-triethoxy silane were stirred in and the whole cooled to room temperature and discharged.

EXAMPLE 5

Preparation of Foundry Sand Cores

A. Phenol Formaldehyde Resins 2,000 grams of Chelford 50 sand was mixed with 9 grams of catalyst for 1 minutes, 30 grams of the resin described in example (2) was added and mixed for 3 minutes and discharged. 2 inch diameter by 2 inch high compression cores were prepared and setting time was judged by squeezing in a wax beaker. The following Table A describes the properties obtained using as catalyst a 65% solution of toluene sulfonic acid (TUX-8) and the catalyst of Example 1 based upon hydrocarbon A (FRD-334).

TABLE A

| Mix Number | Phenol Formaldehyde Resin of |
|---|---|

TABLE A-continued

| Resin Number | Example (2) | |
|---|---|---|
| Sand | Chelford 50 | |
| % Resin | 1.5 | |
| % Catalyst | 30% TUX-8 | 30% FRD-334 |
| Sand Temperature before mixing °C | 24 | 22½ |
| Sand Temperature after mixing °C | 27 | 25½ |
| Exotherm Temperature °C | 27½ | 27 |
| Bench Life minutes | 30 | 15 |
| Set Time minutes | 70 | 25 |
| Compressive Strength kg/m² | | |
| After: 1 hour | 900 | 1750 |
| 2 hours | 2600 | 2210 |
| 4 hours | 4400 | 3320 |
| 24 hours | 6000 | 5300 |
| Free Formaldehyde Level Scale: 0 – 5 | | |
| 0 = no fume: 5 = very high fume | 1 | 1 |
| Ambient Conditions | 24–25°C | 76–78% Relative Humidity |
| Test Conditions | 20°C | 50% Relative Humidity |

Remarks and Conclusions

FRD-334 is almost 3 times as fast in setting time as TUX-8.

B. Phenol Formaldehyde/Furfurul Alcohol Resin.

A similar experiment was conducted with the resin of Example 3. Results are shown in the following Table B.

TABLE B

| Mix Number | 416 | 417 |
|---|---|---|
| Resin Number | TSC-36 | TSC-36 |
| Sand | Chelford 50 | |
| % Resin | 1.5% | |
| % Catalyst | 20% TUX-8 | 20% FRD-334 |
| Sand Temperature before mixing °C | 20 | 20 |
| Sand Temperature after mixing °C | 21½ | 21½ |
| Exotherm Temperature °C | 23½ | 23½ |
| Bench Life minutes | 38 | 20 |
| Set Time minutes | 120 | 50 |
| Compressive Strength kg/m² | | |
| After: 1 hour | 900 | 1250 |
| 2 hours | 2000 | 2200 |
| 4 hours | 3400 | 2900 |
| 24 hours | 5400 | 4100 |
| Free Formaldehyde Level Scale: 0-5 | | |
| 0 = no fume: 5 = very high fume | 4 + | 4 + |
| Ambient Conditions | 23°C 72% R.H. — 25°C, 68% R.H. | |
| Test Conditions | 19°C, 50% Relative Humidity | |

Experiment A was repeated but using 20% of catalyst on the urea formaldehyde/furfuryl alcohol resin of Example 4. Results are shown in the following Table C.

TABLE C

| Mix Number | 414 | 415 |
|---|---|---|
| Resin Number | TCS-23 | TCS-23 |
| Sand | Chelford 50 | |
| % Resin | 1.5% | |
| % Catalyst | 20% UX-8 | 20% FRD-334 |
| Sand Temperature before mixing °C | 22 | 22 |
| Sand Temperature after mixing °C | 24.5 | 25.5 |
| Exotherm Temperature °C | 25.5 | 27 |
| Bench Life minutes | 30 | 19 |
| Set Time minutes | 105 | 45 |
| Compressive Strength kg/m² | | |
| After: 1 hour | 450 | 2200 |
| 2 hours | 2900 | 3400 |
| 4 hours | 4900 | 4500 |
| 24 hours | 5300,4000 | 4800,5400 |
| Free Formaldehyde Level Scale: 0–5 | | |
| 0 = no fume: 5 = very high fume | 4 | 4 |
| Ambient Conditions | 23°C, 72% R.H.—25°C, 68% R.H. 19°C, | |
| Test Conditions | 50% Relative Humidity | |

Shorter setting times are exhibited with all these resins using the products of this invention over conventional toluene sulfonic acid. As can be seen from the tables the molds of the present invention are ready for use and have a higher compressive strength earlier than the specific prior art molds tested. While these may be disadvantages as compared with the prior art over longer storage periods, there are also disadvantages in storing large bulky sand molds for long period just due to the storage space required alone.

What we claim is:

1. A catalyst for the production of resin-bonded foundry molds and cores which comprises a mixture of aromatic petroleum naphtha sulfonic acids which does not crystallize above −5°C and which is prepared by reacting a mixture of aromatic petroleum naphthas with sulfuric acid at 40° to 160°C.

2. Catalyst of claim 1 wherein the acid mixture is substantially anhydrous, the naphthas cover the range of $C_8$ to $C_{12}$ and the mixture of petroleum naphthas is reacted with less than the stoichiometric amount of sulfuric acid.

3. Catalyst of claim 2 which includes an alcohol in amount of from 1 to 5% by weight of catalyst.

4. Catalyst of claim 3 wherein the petroleum naphthas have a boiling range of 130° to 175°C and the alcohol is methanol.

5. Process for the production of foundry molds and cores which comprises coating granules of refractory material with synthetic resin binder in amount of 0.7 to 5.0% by weight of refractory material and with a mixture of aromatic petroleum naphtha sulfonic acids which does not crystallize above −5°C in amount of 0.7 to 5.0% by weight of refractory material, the sulfonic acids are prepared by reacting a mixture of aromatic petroleum naphthas with sulfuric acid at 40° to 160°C.

6. Process of claim 5 wherein the acid mixture is substantially anhydrous and the naphthas cover the range of $C_8$ to $C_{12}$; and the resin binder is selected from the group of resins consisting essentially of phenol formaldehyde, phenol formaldehyde/furfuryl alcohol, urea formaldehyde/furfuryl alcohol, furfuryl alcohol/formaldehyde, polymerized furfuryl alcohol and a mixture of any two or more of such resins.

7. Process of claim 6 wherein the mixture includes an alcohol in amount of 0 to 5% by weight of the mixture and wherein the refractory material is selected from the group consisting of silica sand, quartz, chromite sand, zircon sand, olivine sand, clays and asbestos.

8. Process of claim 7 wherein the petroleum naphthas having a boiling range of 130° to 175°C, the alcohol is methanol and the mixture of sulfonic acids is prepared with less than the stoichionmetric amount of sulfuric acid.

9. Process of claim 8 wherein preparation of the mixture of sulfonic acids includes the step of removing water and unreacted hyrocarbons by vacuum distillation at 40° to 160°C.

10. Process of claim 9 wherein the mixture of sulfonic acids is prepared at 80° to 120°C.

* * * * *